US011627136B1

(12) United States Patent
Sharifi Mehr

(10) Patent No.: US 11,627,136 B1
(45) Date of Patent: Apr. 11, 2023

(54) ACCESS CONTROL FOR RESTRICTED ACCESS COMPUTING ASSETS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 133 days.

(21) Appl. No.: 17/025,941

(22) Filed: Sep. 18, 2020

(51) Int. Cl.
*H04L 9/40* (2022.01)

(52) U.S. Cl.
CPC ................... *H04L 63/101* (2013.01)

(58) Field of Classification Search
CPC .................................................. H04L 63/101
See application file for complete search history.

(56) References Cited

U.S. PATENT DOCUMENTS

| | | | |
|---|---|---|---|
| 10,275,606 B2* | 4/2019 | Kulick | G06F 16/2228 |
| 10,503,967 B2* | 12/2019 | Sarrafzadeh | G06V 40/25 |
| 11,356,449 B2* | 6/2022 | Blass | G06F 21/577 |
| 2013/0326640 A1* | 12/2013 | Nun | H04L 63/105 |
| | | | 726/30 |
| 2014/0337317 A1* | 11/2014 | Woss | G06F 21/6263 |
| | | | 707/722 |
| 2017/0078322 A1* | 3/2017 | Seiver | G06F 21/577 |
| 2018/0012034 A1* | 1/2018 | Rozenberg | G06F 21/6218 |
| 2019/0095626 A1* | 3/2019 | Mohan | G06F 21/577 |

* cited by examiner

*Primary Examiner* — Yonas A Bayou
(74) *Attorney, Agent, or Firm* — Davis Wright Tremaine LLP

(57) ABSTRACT

A system can determine a set of users to access an asset of a computing device. User data for a user in the set of users is obtained. The user data can specify organizational information for the user. The system can determine a value usable to regulate access to the asset. The value can be based on the organizational information for the user, and the value can be further based on other user data attributed to another user in the set of users. Based on the determined value, the system can regulate access to the asset.

21 Claims, 6 Drawing Sheets

ACCESS CONTROL FOR RESTRICTED ACCESS COMPUTING ASSETS

BACKGROUND

Managing risks posed by persons who are granted access to computing assets continually grows in complexity, and numerous resources are expended to prevent unintentional or malicious exploitation of computing assets. Conventional security techniques aim to reduce unauthorized access to computing assets. For example, some security techniques are concerned with the enactment and enforcement of policies and measures which allow and ensure that the correct individuals access the correct assets and computing resources at the right times and for the right reasons.

It can be difficult to implement security techniques to address security risks, both internal and external, in what usually is a complex, online computing environment. For example, decisions about which access rights to grant a particular user can be based on the roles that the user plays within the organization. In large organizations, granting and maintaining user access rights is a difficult and complex process, involving decisions regarding whether to grant rights to thousands of users and hundreds of different applications, databases, and other computing resources. This complexity can be exacerbated by organizational reorganizations and acquisitions, and reconfigurations of the various accessible systems and resources.

The access risks posed by insiders and outsiders can range from careless negligence to more serious cases of financial fraud, corporate espionage, or malicious sabotage of systems and data. Organizations that fail to "meet the challenge" of proactively managing and regularly assessing user access to critical assets can face security risks posed by individuals that have inappropriate access to an organization's assets, such as assets linked to computing resources of the organization.

BRIEF DESCRIPTION OF THE DRAWINGS

Various techniques will be described with reference to the drawings, in which.

DETAILED DESCRIPTION

Figure 1:
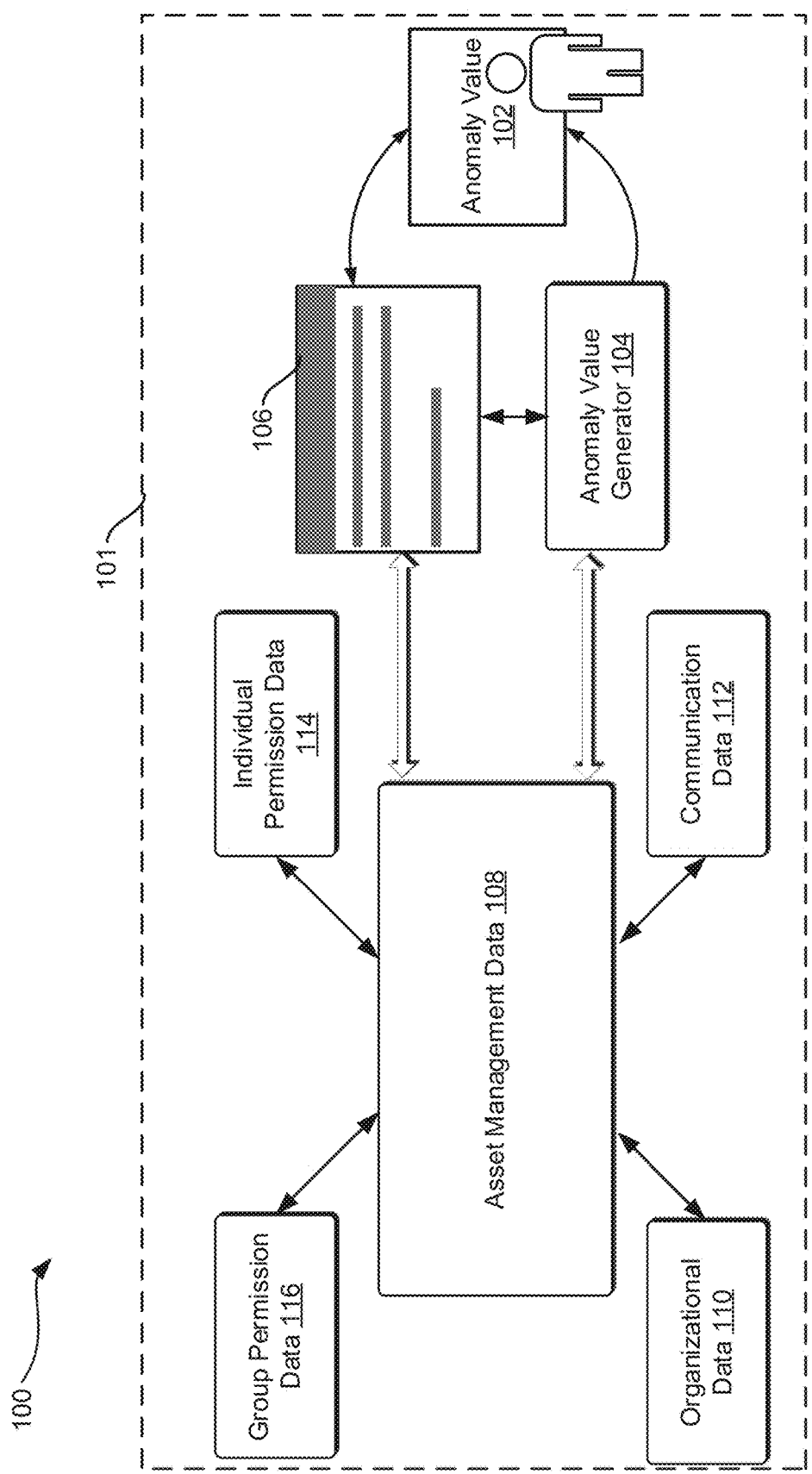
FIG. 1 illustrates an example system environment for generation and use of anomaly values to be assigned to individuals, according to some embodiments.

The described techniques and systems mitigate security risks posed by individuals or computerized entities, implemented by executable instructions, that may be granted or possess inappropriate access to an organization's assets, such as assets linked to computing resources of the organization. The techniques and systems can calculate an anomaly value for individuals or computerized entities that are granted or possess access to an asset. The anomaly value can trigger an automated remediation action to revoke or otherwise modify an individual's or computerized entity's ability to access the asset. Alternatively or in addition, the anomaly value can trigger a call for manual review of the individual's or computerized entity's access to the asset. The anomaly values for individuals and computerized entities can be generated when an individual seeks access to an asset or when the individual or entity seeks access to a permission group having standing access to the asset. The anomaly values for individuals and entities can also be generated as part of a periodic or continuous audit seeking to determine appropriate access to the organization's critical assets. The organization can be an online service provider or customers of the online service provider. The following description refers to individuals and users in relation to anomaly values determined or calculated according to at least some of the described embodiments. Such individuals and users can be human entities or computerized entities, implemented by computer executable instructions.

An organization can maintain or establish asset management data leveraged when an anomaly value is generated for an individual. General organizational data, such as employment or membership data, linked to individuals of the organization can be used to maintain or establish the asset management data. The asset management data can include personnel or business information pertaining to the individual. The personnel information can include a title assigned to the individual. Additionally, the personnel information can include the individual's organizational level, organizational tenure, organizational status (e.g., part-time, full-time, intern, or contractor) with the organization, and the individual's relationship to other individuals in the organization (e.g., organizational chart details). The asset management data can include similar personnel information for many individuals in the organization.

The asset management data can also include compiled data pertaining to the individual that can be used to heuristically adjust the anomaly value determined for the individual. For example, the compiled data can identify the assets that the individual is authorized to access, as well as the other individuals that have similar access to those assets. Additionally, the compiled data can include communication data that identifies interactions, such as by email, meetings, chats, action items, by the individual with other individuals of the organization. The compiled data can also identify individuals that possess aliases, such as email addresses and aliases used in chat room or videoconferencing applications, similar to the individual's aliases. In addition, the compiled data can also identify individuals that possess first and/or last names similar to the individual's first and last names.

Some or all of the data included in the asset management data can be used to determine an anomaly value for an individual to obtain or maintain access to an asset of an organization. For example, a title assigned to the individual and titles assigned to other individuals having access to the asset can be used to determine the anomaly value for the individual. In addition or instead, an organizational level of the individual and organizational levels assigned to other individuals having access to the asset can be used to determine the anomaly value for the individual. In another example, the individual's tenure at the organization and the tenures of other individuals having access to the asset can be used to determine the anomaly value for the individual. Other data associated with the individual and data associated with individuals having access to the asset, including the asset management data, can also be used to determine the anomaly value for the individual.

Several individual anomaly values based on distinct data pertaining to individuals contained in the asset management data, such as the distinct data described in the foregoing paragraph, can serve as a basis for determining the anomaly value for an individual to obtain or retain access to an asset of an organization. The individual anomaly values can be summed. The resulting summation can be divided by a total of the individual anomaly values to determine an anomaly value for the individual.

Based on the determined or calculated anomaly value for an individual, the individual can be granted access to an asset of the organization. The asset can be a computing resource of an online service provider. In another example, based on the determined or calculated anomaly value for the individual, the individual can be allowed to maintain an existing access to the asset of the organization. In another example, the anomaly value for the individual can serve as a basis for allowing the individual to be included in a group of individuals having access rights to assets of the organization.

The determined or calculated anomaly value for an individual can serve as a basis for triggering an automated action with respect to an asset of the organization. For example, an excessive anomaly value, based on a threshold anomaly value, can trigger: expulsion of the individual from a group of individuals having access to an asset, revocation of the individual's current access to the asset, suspension of the individual's current access to the asset, denial of the individual's request to obtain access to the asset, or escalation to cause human review of the individual's current access to the asset or the individual's request to access the asset.

Anomaly values determined for individuals can be stored by an organization. For example, the organization can maintain a database of anomaly values. The anomaly values in the database can be sorted in a variety of different ways. For example, the database can be used to identify anomaly values for individuals in a group having access to an asset of the organization. In another example, the database can be used to identify anomaly values for individuals having access to an asset of the organization, or a set of assets of the organization. The database can also be used to track statistical information, such as average, minimum, and/or maximum anomaly values for a group of individuals having access to an asset. Determined average, minimum, and/or maximum anomaly values for a group of individuals having access to an asset can be used to systematically and dynamically generate anomaly value profiles for the asset. These generated anomaly value profiles can be compared against manually or automatically determined anomaly value thresholds to identify potential access threats to assets of the organization. A threat determination based on such a comparison can trigger a temporary lockdown of an involved asset of the organization. Alternatively, such a threat determination can trigger an alarm that causes human intervention to investigate the potential access threat to the involved asset of the organization.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1), the anomaly value-based embodiments can dynamically establish and update anomaly values for individuals with respect to time, bringing down operational costs and improving the performance and robustness of systems and associated computing resources of an online service provider environment (2), the anomaly value-based embodiments can quickly and efficiently assign, evaluate, and alter anomaly values assigned to individuals, directly resulting in improved security for systems and associated computing resources of an online service provider environment (3), the anomaly value-based embodiments can enhance the services provided to customers of an online service provider, thereby increasing the desirability and demand for those services, and where such increased desirability and demand for those services can strengthen the organizational structure and performance of an online service provider, (4) the anomaly value-based embodiments can reduce network security personnel interactions with various security tools and the use of such tools, which can result in improved performance of systems and associated computing resources of an online service provided by moderating the use of those computing resources for network security tasks, where the improved performance of the computing resources can provide reduced network latency and memory use while enhancing the execution speed of those computing resources, and so forth.

FIG. 1 illustrates an example system environment 100, comprising computing devices 101 and data, for generation and use of anomaly values to be assigned to individuals, according to some embodiments. The system environment 100 can be provided by an online service provider. In some embodiments, the online service provider can provide one or more services to customers. The customers can pay the online service provider to use the one or more services. In some embodiments, anomaly value generation and the assignment of such anomaly values to individuals are part of a service that the online service provider offers to its customers.

In some embodiments, the system environment 100 provides for generation of anomaly values to be assigned to users, also referred to as individuals herein and the terms user(s) and individual(s) are to be understood as synonymous, that access assets of the system environment 100, the online service provider, and/or computing resources linked to customers of the online service provider. In some embodiments, users that access assets of the system environment 100 can be human users or users implemented in software or hardware of the system environment 100. For example, users implemented in software and/or hardware of the system environment 100 can be system created "bots," such as computerized users implemented by executable instructions that operate in the system environment 100 to perform one or more tasks set forth by computing devices of the environment 100 or one or more human users of the environment 100. In some embodiments, the system environment 100 is part of a for-profit organization, such as a business with employees. The system environment 100 can also be part of a not-for-profit organization, such as an entity that has an associated membership pool of members.

Figure 6:
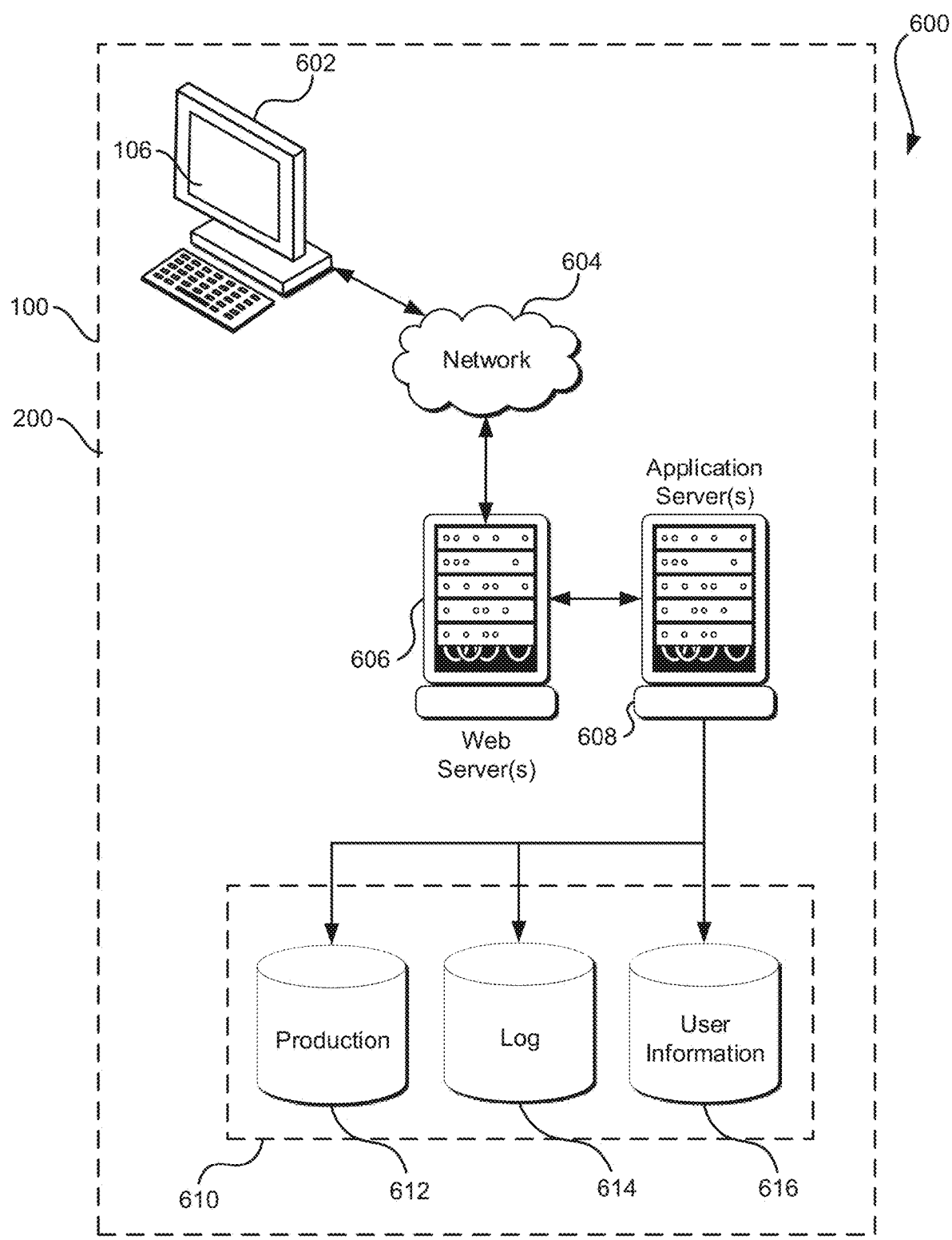
FIG. 6 illustrates aspects of an example system for implementing aspects in accordance with an embodiment.

Example assets or resources of the system environment 100, which may require controlled access by individuals or groups of individuals, can include managed hosts and managed services in a distributed computing environment, load balancers, application programming interfaces (APIs), API gateways, build and deployment pipelines, artifact repositories, executable program code for applications and services, components of applications, components of services, executable programs (e.g., applications, services, packages, and so on), configurations of programs, storage resources (e.g., as managed by network accessible storage services), configurations of storage resources, databases and database tables, execution environments, hosts or other computing devices, network devices (e.g., routers), network entities (e.g., virtual private clouds), abstractions such as host classes, containers, tasks submitted to program execution services, other network accessible services, access credentials, cryptographic software and cryptographic hardware, runtime operational and security configurations, web portals and sites, monitoring dashboards, alarming systems, grouped assets, such as bindles and user groups, servers and other computing devices, including computing storage and data hosted by such storage, and other computer resources and assets, such as those implemented by example system 600 illustrated in FIG. 6, and so on.

The generation and assignment of anomaly values, such as an anomaly value 102, to individuals can occur automatically or dynamically through an anomaly value generator 104. In some embodiments, the generation and assignment of anomaly values, such as the anomaly value 102, to individuals can occur through a user interface 106 that facilitates identifying and reviewing individuals to access assets of the system environment 100. Some of those assets may be critical assets that require tightly controlled access and use by a limited set of authorized individuals. The user interface 106 can communicate with the anomaly value generator 104 to cause the anomaly value generator 104 to generate the anomaly value 102. In some embodiments, the user interface 106, initiated through human use of the interface 106, can cause the anomaly value generator 104 to generate the anomaly value 102. The anomaly value 102 can be communicated to the interface 106 for further consideration by a user of the interface 106 and/or dissemination to computing resources of the system environment 100. In some implementations, the anomaly value generator 104 and the user interface 106 can include computer executable instructions, logic implemented through processing hardware, or a combination of software and hardware that processes asset management data 108 to determine or calculate individual anomaly values 102 for various individuals of an organization or other entity. The asset management data 108 can comprise metadata linked to some or all individuals of an organization.

Asset management data 108 can be leveraged to facilitate determining or calculating the anomaly value 102. Specifically, the asset management data 108 can be accessed by the user interface 106 or the anomaly value generator 104. The asset management data 108 can be stored, as metadata, in computing storage of the system environment 100. For example, the asset management data 108 can be hosted on a server or a plurality of servers of the system environment 100. In some embodiments, the asset management data 108 is stored in a database of the system environment 100. Whether through the anomaly value generator 104, the user interface 106, or another computing resource of the system environment 100, the anomaly value 102 can be calculated using an equation that accepts one or more numerical values determined from asset management data 108 comprising metadata related to an individual to be assigned the anomaly value 102 and further based on asset management data 108 comprising metadata related to at least one additional individual that possesses access to an asset that the individual to be assigned the anomaly value 102 is to access. In some embodiments, the equation accepts numerical values derived from organizational information, contained in metadata, such as title, level or rank in an organization, tenure, status or type (e.g., full-time, part-time) in the organization, location, and/or organization structure (e.g., organization chart data). An anomaly value calculated by the equation can be refined using additional data from the asset management data 108. In some embodiments, the additional data can also be included in metadata of the asset management data 108. The additional data can include group membership data, communication data, alias data, and/or name data. The additional data can pertain to the individual to be assigned the anomaly value 102 and the at least one additional individual that possesses access to the asset that the individual to be assigned the anomaly value 102 is to access.

The asset management data 108 can comprise user metadata obtained from one or more data sources of the system environment 100 or one or more sources of the system environment 100 and sources that can be external to the system environment 100. In some embodiments, the asset management data 108 includes metadata for each individual (e.g., personnel, members, or employees) of an organization. Various data of the asset management data 108 are described in the following. Such data can be included in the individualized metadata comprised in the asset management data 108.

Organizational data 110 can be included in the asset management data 108. The organizational data 110 can include titles (e.g., personnel or business title such as a manager or vice president) of individuals associated with an organization, such as an online service provider. The organizational data 110 can also include levels (e.g., personnel or employment level) of the individuals associated with the organization. Furthermore, the organizational data 110 can include the tenures (e.g., length of employment) of the individuals associated with the organization.

In some embodiments, the organizational data 110 can include the personnel or employment type (e.g., part-time, full-time, permanent, intern, contractor) of the individuals associated with the organization. Furthermore, the organizational data 110 can include the locations (e.g., geographical location, office location, employment location) of the individuals associated with the organization. The organizational data 110 can also include the individual's relationship to other individuals in the organization (e.g., business or personnel organizational chart details). In some embodiments, the organizational data 110 can include alias information of individuals associated with the organization. The alias information can include email addresses, chat room aliases, and other short form names assigned to personnel and individuals of the organization. The organizational data 110 can also include detailed name information of the personnel and individuals associated with the organization. The detailed name information can include the first and last names of the individuals of the organization.

The asset management data 108 can also comprise communication data 112. The communication data 112 can include details of interactions between individuals associated with the organization. In some embodiments, the asset management data 108 tracks communication data 112 that includes some or all of the electronic communications between individuals of the organization. Such electronic communications can include emails, meeting minutes, chat transcripts, action items shared among various individuals of the organization, videoconferencing data, such as video transcripts and/or audio transcripts derived from the videoconferencing data, and the like.

In some embodiments, the asset management data 108 also includes individual permission data 114. This individual permission data 114 can be accumulated for each individual associated with the organization. In some embodiments, the individual permission data 114 can identify the one or more assets that the individual can access or otherwise use. In addition, the individual permission data 114 can identify the individual's membership to one or more groups of the organization. These groups can include a plurality of individuals, and the groups and the individuals in the groups can have access to a variety of assets in the system environment 100.

The asset management data 108 can also incorporate group permission data 116. The group permission data 116 can comprise data that identifies the groups established within the organization. The groups can identify individuals that have membership rights to various groups in the organization. Furthermore, the group permission data 116 can identify the types of permissions, such as permissions to assets of the organization that the individual groups possess.

As described in greater detail herein, some or all of the data associated with the asset management data 108 can be leveraged when determining or calculating the anomaly value 102. This anomaly value 102 can be assigned to an individual of the organization. In some embodiments, each of the individuals associated with the organization will have an assigned determined or calculated anomaly value 102. The anomaly value 102 can be used by computing resources of the system environment 100 to evaluate access rights (e.g. access rights to assets) possessed by the individual.

In some embodiments, intelligence built into the system environment 100, such as artificial intelligence (AI) and/or trained machine learning (ML) intelligence can be used to evaluate the access rights possessed by the individual in accordance with the anomaly value 102 generated based on the asset management data 108. Additionally, in some embodiments, the anomaly value 102 can be evaluated manually, such as through the user interface 106. Furthermore, in some embodiments, the anomaly value 102 can trigger a remediation action, by way of the system environment 100, the anomaly value generator 104, and/or the user interface 106, to act upon the individual's current or pending access to one or more assets of the system environment 100. In some embodiments, regulating access to the assets of the system environment 100 comprises allowing the individual to access an asset, revoking the individual's access to the asset, suspending the individual's access to the asset, or flagging the individual's access to the asset. The flagging action can trigger additional review of the individual's access to the asset. The additional review can be system implemented, such as by the anomaly value generator 104 using integrated AI or ML techniques. In some embodiments, the additional review can involve human interaction with the user interface 106.

Figure 2:
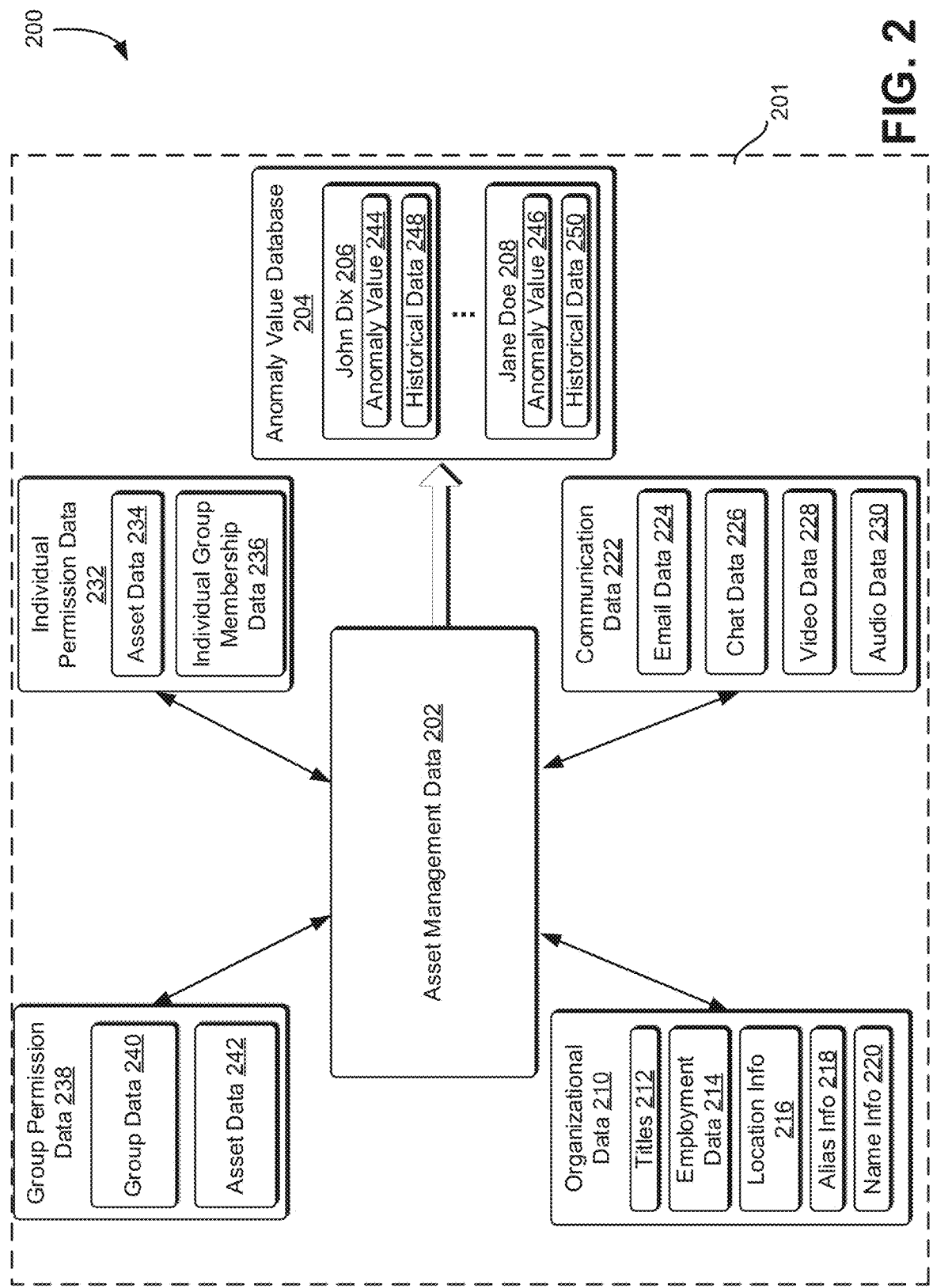
FIG. 2 illustrates modules of an example system environment for generation and use of anomaly values to be assigned to individuals, according to some embodiments.

FIG. 2 illustrates modules of an example system environment 200, comprising computing devices 201 and data, for generation and use of anomaly values to be assigned to individuals, according to some embodiments. In some embodiments, individuals or users that access assets of the system environment 200 can be human users or users implemented in software or hardware of the system environment 200. For example, users implemented in software and/or hardware of the system environment 200 can be system created bots that operate in the system environment 200 to perform one or more tasks set forth by computing devices of the environment 100 or one or more human users of the system environment 200. The system environment 200 can be provided by an online service provider. In some embodiments, the online service provider can provide one or more services to customers. The customers can pay the online service provider to use the one or more services. In some embodiments, anomaly value generation and the assignment of such anomaly values to individuals are part of a service that the online service provider offers to its customers. In some embodiments, the system environment 200 can include some or all of the system elements associated with the system environment 100 illustrated in FIG. 1. Furthermore, in some embodiments, the system environment 200 can include some or all of the computing resources illustrated in FIG. 6 and described with reference thereto.

In some embodiments, the system environment 200 provides for generation of anomaly values to be assigned to users that access assets of the system environment 200, the online service provider, and/or computing resources linked to customers of the online service provider. In some embodiments, the system environment 200 is part of a for-profit organization, such as a business with employees. The system environment 200 can also be part of a not-for-profit organization, such as an entity that has an associated membership pool of members.

Example assets or resources of the system environment 200, which may require controlled access by individuals or groups of individuals, can include managed hosts and managed services in a distributed computing environment, load balancers, APIs, API gateways, build and deployment pipelines, artifact repositories, executable program code for applications and services, components of applications, components of services, executable programs (e.g., applications, services, packages, and so on), configurations of programs, storage resources (e.g., as managed by network accessible storage services), configurations of storage resources, databases and database tables, execution environments, hosts or other computing devices, network devices (e.g., routers), network entities (e.g., virtual private clouds), abstractions such as host classes, containers, tasks submitted to program execution services, other network accessible services, access credentials, cryptographic software and cryptographic hardware, runtime operational and security configurations, web portals and sites, monitoring dashboards, alarming systems, grouped assets, such as bindles and user groups, servers and other computing devices, including computing storage and data hosted by such storage, and other computer resources and assets, such as those implemented by example system 600 illustrated in FIG. 6, and so on.

The generation and assignment of anomaly values to individuals can occur automatically or dynamically through the anomaly value generator 104 illustrated in FIG. 1. In some embodiments, the generation and assignment of anomaly values to individuals can occur through the user interface 106, illustrated in FIG. 1 that facilitates identifying and reviewing individuals to access assets of the system environment 200. Some of those assets may be critical assets that require tightly controlled access and use by a limited set of authorized individuals.

Asset management data 202 of the system environment 200 can be leveraged to facilitate establishing anomaly values tied to individuals. These anomaly values can be stored in an anomaly value database 204. For example, the anomaly value database 204 can contain references to individuals that have associated anomaly values generated in accordance with the disclosed systems and techniques. In some embodiments, the anomaly value database 204 comprises data identifying individuals of a for-profit or not-for-profit organization. In the illustrated example of FIG. 2, the anomaly value database 204 comprises data identifying a plurality of individuals, such as John Dix 206 and Jane Doe 208. The data identifying John Dix 206 can include an assigned anomaly value 244 determined based on the disclosed systems and techniques. Additionally, the data identifying Jane Doe 208 can include an assigned anomaly value 246 determined based on the disclosed systems and techniques. The anomaly value database 204 can include data referencing additional individuals of an organization.

The anomaly value database 204 can also include historical data. In some embodiments, this historical data pertains to one or more anomaly values previously assigned, based on the anomaly value determining or calculating systems and techniques disclosed herein, to individuals tracked using the anomaly value database 204. For example, as illustrated in FIG. 2, the anomaly value database 204 can store historical data 248 for John Dix 206. In some embodiments, the historical data 248 includes one or more prior anomaly values determined or calculated for John Dix 206. Similarly, the anomaly value database 204 can store historical data 250 for Jane Doe 208. In some embodiments, the historical data 250 includes one or more prior anomaly values determined or calculated for Jane Doe 208.

In some embodiments, the system environment 200 can leverage the historical data included in the anomaly value database 204 when determining or evaluating an individual's current, pending, and/or future right to access an asset of the system environment 200. For example, the system environment 200 can compare John Dix's 206 current anomaly value 244 against his prior one or more anomaly values included in the historical data 248. A change in the current anomaly value 244 compared to the prior one or more anomaly values including the historical data 248 can cause the system environment 200 to evaluate John Dix's 206 access to one or more assets of the system environment 200. Such evaluation can cause the system environment 200 to deny or revoke John Dix's 206 access to an asset, suspend John Dix's 206 access to the asset, or flag John Dix's 206 access to the asset. The flagging action can trigger additional review of John Dix's 206 access to the asset. The additional review can be system implemented, such as by the anomaly value generator 104 using integrated AI or ML techniques. In some embodiments, the additional review can involve human interaction with the user interface 106.

In some embodiments, a percentage value can be used by the system environment 200 to evaluate the current anomaly value 244 compared to the prior one or more anomaly values included in the historical data 248. For example, the system environment 200 can calculate an amount of increase in the current anomaly value 244 based on prior one or more anomaly values included in the historical data 248. The system environment 200 can then divide the amount of increase in the current anomaly value 244 by at least one of the anomaly values included in the historical data 248 or an average of a plurality of the anomaly values included in the historical data 248, with the resulting quotient multiplied by 100 to determine a percentage increase or decrease of the current anomaly value 244 based on prior one or more anomaly values included in the historical data 248. The system environment 200 can compare the calculated percentage to a system determined or human determined predetermined percentage reference value. When the calculated percentage exceeds the predetermined percentage reference value, the system environment 200 can trigger human or system-level evaluation of John Dix's 206 access to one or more assets of the system environment 200. Such evaluation can cause the system environment 200 to deny or revoke John Dix's 206 access to an asset, suspend John Dix's 206 access to the asset, or flag John Dix's 206 access to the asset. The flagging action can trigger additional review of John Dix's 206 access to the asset. The additional review can be system implemented, such as by the anomaly value generator 104 using integrated AI or ML techniques. In some embodiments, the additional review can involve human interaction with the user interface 106.

The asset management data 202 can comprise data obtained from one or more sources of the system environment 200 or one or more sources of the system environment 200 and sources that can be external to the system environment 200. Organizational data 210 can be included in the asset management data 202. The organizational data 210 can include titles 212 (e.g., business title such as a manager or vice president) of individuals associated with an organization, such as an online service provider. The organizational data 210 can also include employment or membership data 214, such as levels (e.g., employment or membership level) of the individuals associated with the organization. Furthermore, the employment or membership data 214 can include the tenures (e.g., length of employment or membership) of the individuals associated with the organization.

In some embodiments, the employment or membership data 214 can include the employment type (e.g., part-time, full-time, permanent, intern, contractor) of the individuals associated with the organization. Furthermore, the organizational data 210 can include location information 216 including the locations (e.g., geographical location, office location, employment location) of the individuals associated with the organization. The employment or membership data 214 can also include the individual's relationship to other individuals in the organization (e.g., organizational or membership structure details). In some embodiments, the organizational data 210 can include alias information 218 of individuals associated with the organization. The alias information can include email addresses, chat room aliases, and other short form names assigned to individuals of the organization. The organizational data 210 can also include detailed name information 220 of the individuals associated with the organization. The detailed name information 220 can include the first and last names of the individuals of the organization.

The asset management data 202 can also comprise communication data 222. The communication data 222 can include details of interactions between individuals associated with the organization. In some embodiments, the asset management data 108 tracks communication data 222 that includes some or all of the electronic communications between individuals of the organization. Such electronic communications can include email data 224, chat data 226, action items shared among various individuals of the organization, videoconferencing data, such as video data 228 and/or audio data 230 derived from the videoconferencing data, and the like.

In some embodiments, the asset management data 202 also includes individual permission data 232. This individual permission data 232 can be accumulated for each individual associated with the organization. In some embodiments, the individual permission data 232 can identify the one or more assets that the individual can access or otherwise use. Such identified one or more assets can be included in asset data 234 of the individual permission data 232. In addition, the individual permission data 232 can identify the individual's membership in one or more groups of the organization. These groups can include a plurality of individuals, and the groups, and the individuals in the groups, can have access to a variety of assets in the system environment 200. The individual's membership to one or more groups of the organization can be comprised in individual group membership data 236, which can include comprehensive group data for some or all individuals of the organization.

The asset management data 202 can also incorporate group permission data 238. The group permission data 238 can comprise data that identifies the groups established within the organization. The groups established within the organization can be included in group data 240. The group data 240 can identify individuals that have membership rights to various groups in the organization. Furthermore, the group permission data 238 can identify the types of permissions, such as permissions to assets of the organization that the individual groups possess. Assets of the organization that the groups can access can be comprised in asset data 242 of the group permission data 238.

Some or all of the data associated with the asset management data 202 can be leveraged when determining or calculating the anomaly values stored in the anomaly value database 204. These anomaly values can be assigned to individuals of the organization, such as John Dix 206 and Jane Doe 208. In some embodiments, each of the individuals associated with the organization will have an assigned determined or calculated anomaly value. The anomaly values in the anomaly value database 204 can be used by computing resources of the system environment 200 to evaluate access rights (e.g. access rights to assets) possessed by the individuals or to be assigned to the individuals.

In some embodiments, intelligence built into the system environment 200, such as AI or ML intelligence can be used to evaluate the access rights possessed by individuals in accordance with anomaly values generated based on the asset management data 202. Additionally, in some embodiments, the anomaly values can be evaluated manually, such as through the user interface 106 illustrated in FIG. 1. Furthermore, in some embodiments, the anomaly values can trigger a remediation action, by way of the system environment 200, the anomaly value generator 104 (illustrated in FIG. 1), and/or the user interface 106, to act upon the individual's current or pending access to one or more assets of the system environment 200. In some embodiments, regulating access to assets of the system environment 200 comprises allowing an individual to access an asset, revoking the individual's access to the asset, suspending the individual's access to the asset, or flagging the individual's access to the asset. The flagging action can trigger additional review of the individual's access to the asset. The additional review can be system implemented, such as by the anomaly value generator 104 using integrated AI or ML techniques. In some embodiments, the additional review can involve human interaction with the user interface 106.

The following describes various embodiments for determining or calculating an anomaly value for an individual(s). It is to be understood that the described embodiments for determining or calculating the anomaly value are not exhaustive. Moreover, it is to be understood that one or more of the described embodiments for determining or calculating the anomaly value can be used individually and/or collectively to determine or calculate the anomaly value.

In some embodiments, an anomaly value is determined or calculated for individual members of permission groups comprising a plurality of members. The anomaly values can be used to initiate automated remediation actions (e.g., asset access revocation) or cause or launch manual reviews (e.g., owner and/or reverse access baselining) to verify the anomalies are a result of intentional and informed asset access rights decisions. The determined or calculated anomaly values and any follow-up remediation actions can either be surfaced/enforced when adding individuals to permission groups or as part of periodic or continuous audits associated with access rights to one or more assets of an organization.

For each individual in an organization, an anomaly value can be determined or calculated based on the data of the asset management data 108 or the asset management data 202. In some embodiments, the anomaly value for an individual is calculated when the individual is to be granted access to an asset. The anomaly value for an individual can also be calculated when the individual is granted access to a group of individuals that have access to one or more assets. In some embodiments, the anomaly value for an individual can be calculated as part of an ongoing process to evaluate access to assets by individuals of an organization. In some embodiments, anomaly values for individuals are calculated based on some or all of the following data.

(1) Title data: the use of this data aims to determine how many other group members have the same or similar title as the individual. Depending on an exact title match or similar title match to the individual's title, a different weight can be used to adjust a measurement for a sub-anomaly (that is defined as an anomaly measured for each factor, such as title and an overall anomaly value can be calculated based on weighted accumulation of sub-anomalies). For example, if the individual is the only one who is a "software development engineer" and the other nine (9) individuals being considered, such as individuals in a group that the individual is to join, are "security engineers", the anomaly value is calculated as $1-1/10=0.9$. The anomaly value can be adjusted based on title similarity (e.g., both technical roles) using a weight factor of 0.2 (this value can be calculated based on commonality of role types coexisting in other groups in the same organization or peer groups—e.g., groups owned by peers of the current group owners) which results in $0.2*0.9=0.18$ and presents a significantly lower sub-anomaly value.

(2) Level data: level data can be used to determine or calculate how many group members are at the same level or at a similar level as the individual to be assigned an anomaly value. The calculation for the sub-anomaly value based on level data is similar to the calculation based on title data. For example, if there are two (2) members at L3 in the group and the other eight (8) members are L5 and L6, then the initial anomaly value for the individual is calculated as $1-2/10=0.8$. The anomaly value can be adjusted based on a weight factor derived from the existence of such a mix in other groups of the same organization or similar groups within the organization.

(3) Tenure data: tenure data can be used to determine or calculate how many group members have been with an organization for the same or similar length of time as the individual. The calculation for this sub-anomaly value is similar to the calculations based on title data and level data. However, in some embodiments, coarser tenure categories (e.g., less than 2 years, between 2 and 5 years, between 5 and 10 years, and so forth) can be considered to avoid oversensitivity in calculation of sub-anomaly values based on tenure data. In some embodiments, the same heuristic and manual bucketing mechanisms can be used with other applicable factors, such as level, e.g., (1) individuals at L3 and lower, (2) L4 to L7, (3) L8 to L10, and (4) L11 to L12.

(4) Organizational status data: organizational status data (e.g., part-time, full-time, intern, or contractor) can be used to determine or calculate how many other group members share the same organizational status (e.g., employment type) as the individual. The calculation for this sub-anomaly value is similar to the calculations based on title data, level data, and tenure data. However, in some embodiments, an extension to the calculation or determination of the anomaly value for this factor and previous factors, historical group membership information or data can be considered. For example, if a group member is the only intern out of nine (9) other current group members, but historically the group has had ten (10) other members and five (5) of them were interns, the sub-anomaly value can be calculated as $1-(1+5)/(10+10)=0.7$ (e.g., as opposed to the otherwise typically calculated anomaly value using $1-1/10=0.9$).

(5) Location data: location data can be used to determine or calculate how many other group members share the same location as the individual. The calculation for this sub-anomaly value is similar to the calculations based on title data, level data, tenure data, and organizational status data. However, the previous calculation techniques in the foregoing gave the same weight to each match in the group. For example, if two (2) group members (out of ten (10) members) shared the same location, then the sub-anomaly value for them would be calculated as $1-2/10=0.8$. However, in some embodiments, it may be beneficial to exponentially increase the impact of similar members and reduce the level of anomaly. For example, in some embodiments, an exponential factor of two (2) can be used. The resulting calculation been $1-\max(1, 2^2)/10=1-0.4=0.6$ for the sub-anomaly value. This exponential impact adjustment can provide improved normalcy (i.e., a lower anomaly value) for the remaining group members that will have $1-\max(1, 8^2)/10=1-1=0.0$ (as oppose to non-exponential impact analysis that would lead to $1-8/10=0.2$ as their sub-anomaly value).

(6) Organizational chart data: organizational chart data can be used to determine or calculate any commonality between the individual's organizational chain and organizational chains of other individuals in a group. The calculation for this sub-anomaly value is similar to the calculations based on title data, level data, tenure data, organizational status data, and location data. In some embodiments, a count-set with all the individuals of the organizational chain from each individual of the group (e.g., if a manager is in the chain of management for five (5) individuals of the group, then the count-set would equal five (5)). For example assume there is a count-set of (mgr-A:1, mgr-B:1, mgr-C:10, mgr-D:10), and an individual has mgr-A and mgr-B in their management chain. For this individual, the sub-anomaly value can be determined (using the non-exponential impact analysis for simplicity here) through $1-(1+1)/(1+1+10+10)=1-2/22=0.9$.

Accordingly, and as described in the foregoing, the anomaly value for the individual can be determined or calculated based on weighted accumulation (e.g., $[W(F1)*Anomaly(F1)+W(F2)*Anomaly(F2)+ \ldots ]/(W(F1)+W(F2)+ \ldots ))$ of some or all of the foregoing sub-anomaly values. The weights for accumulation of sub-anomaly values can be calculated based on commonality (or lack of commonality) of sub-anomaly values in the group owner's organization or assigned intuitively based on the common knowledge.

The anomaly value determined or calculated for the individual, based on the foregoing, can be adjusted heuristically, using the following factors, to derive an adjusted anomaly value for the individual or a plurality of individuals associated with an organization.

(1) Group permission data: group permission data can be used to determine how many other groups the individual has in common with individuals of a current group. For example, if the individual has at least X groups in common with other individuals of a current group, then an anomaly value reduction of Y % can be applied.

(2) Communication data: communication interactions with other group individuals (e.g., email, meetings, chats, tickets) can be used to make a heuristic adjustment to the anomaly value. For example, the communication data can be used to determine if the individual interacted with other members of the group (e.g., during a look-back window of N-days, N-weeks, etc.). For example, if the individual has interacted with at least X members of the group over Y mediums (e.g., email, meetings, chats, tickets), then the anomaly value is reduced with a factor of Z %.

(3) Alias data: alias data can be used to determine other individuals with similar aliases to the individual's alias (e.g., using the Levenshtein distance <K). For example, if there are more than X individuals with a similar alias to the individual's alias, then the anomaly value can be amplified with a factor of Y %. In some embodiments, the amplification factor can be increased based on some reasonable likelihood that individuals with similar aliases will be included in the same group as the individual.

(4) Name data: name data can be used to determine other individuals with similar names, both first and last names, to the individual's first and last names. For example, if there are more than X individuals with a similar or same name(s) to the individual's name(s), the anomaly value can be amplified with a factor of V %. In some embodiments, the amplification factor can be increased based on some reasonable likelihood that individuals with similar or same names will be included in the same group as the individual.

In addition to an anomaly value calculated for each individual, such as individuals in a group having access to one or more assets of an organization, the system can track statistical values, such as average and max anomalies at the group level, or based on a plurality of individuals of an organization. The group level anomalies can be used to build a baseline, and alarms can be triggered based on breaches of common trends (e.g., a spike of an average anomaly value of a group of individuals beyond a configured threshold or a system determine threshold). The anomaly value spikes (e.g., average anomaly) at the group level may present mistakes in bulk addition of new individuals or sub-groups. Depending on the level of an anomaly value spike, different types of remediation action and escalation can be enforced. For example, for group anomalies between 0.6 and 0.8, only the group owner(s) (e.g., primary and secondary) are notified but for anomaly values higher than 0.8, the group owners' managers are also looped in for review. Also, depending on the organization configurations, there might be automated remediation actions, such as the application of auto-revocation or suspension of group memberships.

Figure 3:
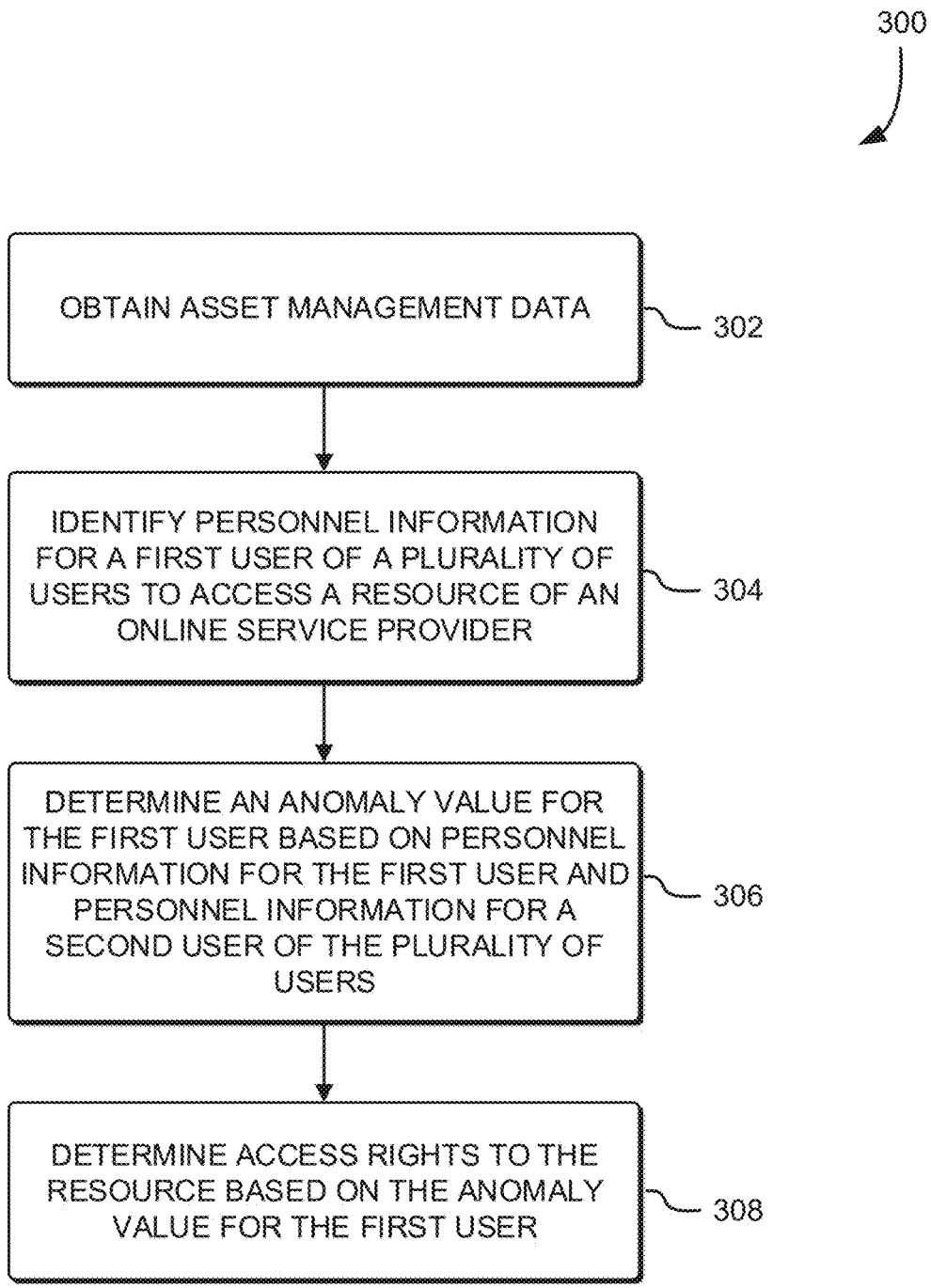
FIG. 3 illustrates a flow diagram including various processing acts, implemented by a system environment with one or more computing devices, which provide anomaly value determination or calculation for individuals of an organization.

FIG. 3 illustrates a flow diagram 300 including various processing acts, implemented by a system environment with one or more computing devices, which provide anomaly value determination or calculation for individuals of an organization. In some implementations, the acts of the flow diagram 300 can be executed by one or more computing devices of the example system environments 100 and 200 illustrated in FIGS. 1 and 2, respectively. The example system environments 100 and/or 200 can execute computer executable instructions incorporating at least some of the processing acts of the flow diagram 300 to provide generation, determination, or calculation of anomaly values for individuals of an organization.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer readable instructions included on a computer storage media. The term "computer readable instructions," and variants thereof, as used in the description and claims, is used expansively herein to include routines, applications, application modules, program modules, system modules, programs, components, data structures, algorithms, and the like. Computer readable instructions can be implemented on various system configurations, including single processor or multiprocessor systems, minicomputers, mainframe computers, distributed computer systems, personal computers, hand held computing devices, microprocessor based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At block 302, asset management data from a system environment is obtained. In some embodiments, the system environment can be the system environment 100 and/or the system environment 200. In some implementations, the system environment can be part of an online service provider. Alternatively, the system environment can be part of a system environment linked to a customer of the online service provider. In some embodiments, the system environment is part of an organization, such as a not-for-profit or for-profit organization. The organization may comprise a plurality of employees, and in some implementations, the organization can comprise members.

In some embodiments, the asset management data obtained at block 302 comprises user data for a plurality of users to access a resource of an organization, such as the online service provider. In some embodiments, the resource is an asset of the organization. In some embodiments, the asset is a critical asset of the organization. An example critical asset of the organization can be an asset that requires that an individual or a plurality of individuals have approved access rights to the asset. As described herein, the asset can be a computer storage with sensitive data, an access controlled software application, an access controlled group, and the like.

In some embodiments, the asset management data obtained at block 302 comprises personnel information for individual users of a plurality of users. For example, the personnel information can comprise title information for the individual users, first and last names of the individual users, communication information or data linked to the individual users, and so forth.

At block 304, personnel information for a first user of the plurality of users to access a resource of the online service provider is identified. As described, in some embodiments, the personnel information can comprise title information for the individual users, first and last names of the individual users, communication information or data linked to the individual users, and so forth. In some implementations, the first user is an individual to join a group of individuals that currently have standing access to the resource of the online service provider.

At block 306, an anomaly value for the first user is determined. The determined anomaly value can be based on a plurality of sub-anomaly values. In some embodiments, the anomaly value can be based on the personnel information for the first user. Furthermore, the anomaly value can be based on the personnel information for a second user of the plurality of users to access the resource of the online service provider. The personnel information can comprise title information for the individual users, first and last names of the individual users, communication information or data linked to the individual users, and so forth. In some embodiments, the second user is associated with a group that the first user is to join. In some embodiments, the anomaly value for the first user is determined based on a calculation that involves numerical representations of the personnel information for the first user and the personnel information for the second user.

In some embodiments, the anomaly value can be determined using an equation that accepts one or more numerical values determined from asset management data related to a first user to be assigned the anomaly value and further based on asset management data related to at least one additional user that possesses access to an asset that the first user to be assigned the anomaly value is to access. In some embodiments, the equation accepts numerical values derived from organizational information, such as title, level or rank in an organization, tenure, status or type (e.g., full-time, part-time) in the organization, location, and/or organization structure (e.g., organization chart data). An anomaly value calculated by the equation can be refined using additional data from the asset management data. The additional data can include group membership data, communication data, alias data, and/or name data. The additional data can pertain to the first user to be assigned the anomaly value 102 and the at least one additional user that possesses access to the asset that the first user to be assigned the anomaly value is to access.

At block 308, based on the anomaly value for the first user, access rights to the resource are determined. In some embodiments, the access rights to the resource pertain to the first user. In some embodiments, the anomaly value for the first user is automatically or manually analyzed to determine the access rights to the resource. For example, when the anomaly value is below an anomaly value threshold, the first user can be granted access rights to the resource. However, in another example, when the anomaly value falls within an anomaly value range, access rights to the resource can be delayed pending further review, where such review may be automated AI or ML analysis or accomplished by way of human analysis. In some embodiments, when the anomaly value exceeds an anomaly value threshold, access rights the resource can be suspended, revoked, disallowed, and so forth, pending results from machine or human analysis.

Figure 4:
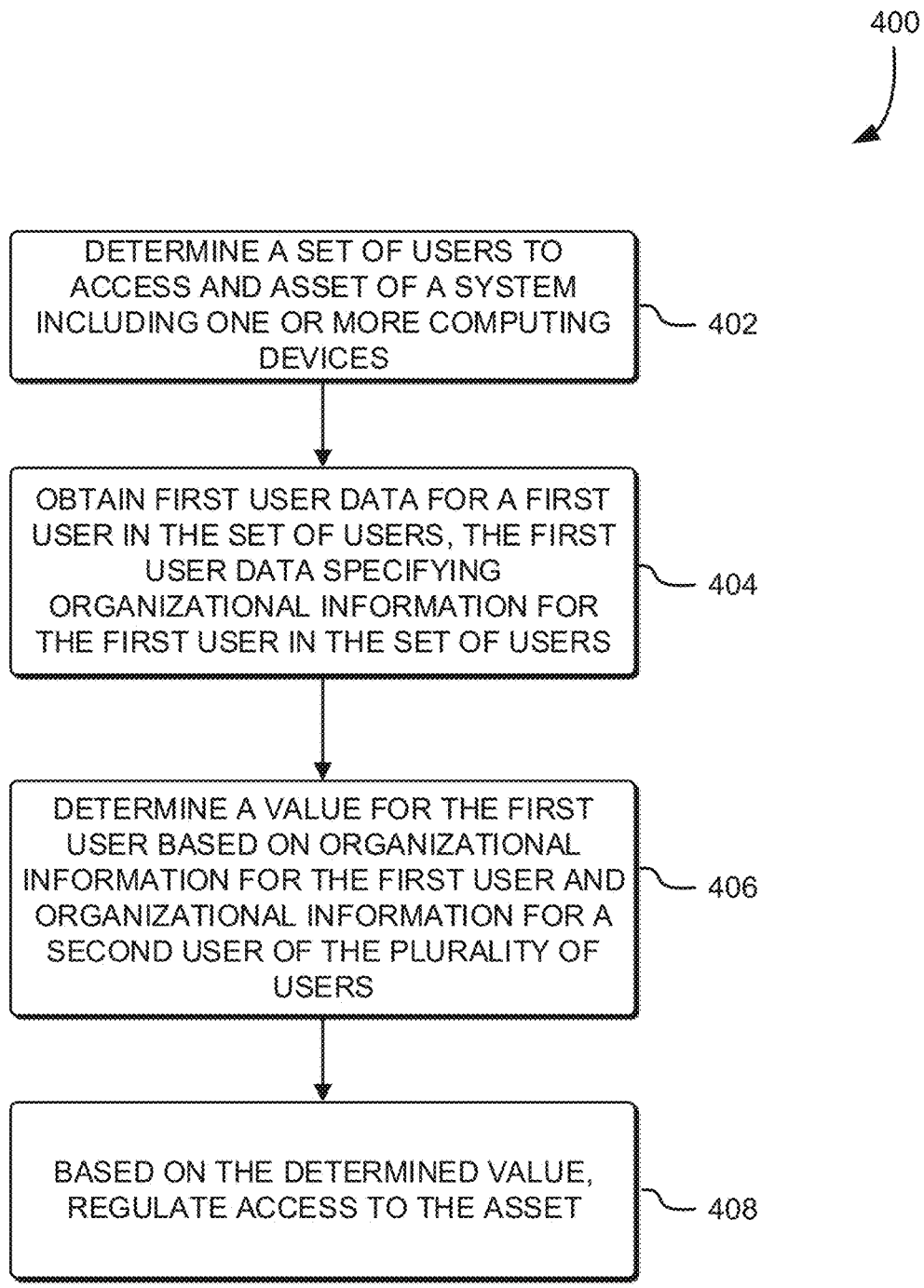
FIG. 4 illustrates another flow diagram including various processing acts, implemented by a system environment with one or more computing devices, which provide anomaly value determination or calculation for individuals of an organization.

FIG. 4 illustrates a flow diagram 400 including various processing acts, implemented by a system environment with one or more computing devices, which provide anomaly value determination or calculation for individuals of an organization. In some implementations, the acts of the flow diagram 400 can be executed by one or more computing devices of the example system environments 100 and 200 illustrated in FIGS. 1 and 2, respectively. The example system environments 100 and/or 200 can execute computer executable instructions incorporating at least some of the processing acts of the flow diagram 400 to provide generation, determination, or calculation of anomaly values for individuals of an organization.

At block 402, a set of users to access an asset associated with a system including one or more computing devices is determined. In some embodiments, the set of users includes a group of users having access to the asset and at least one additional user to obtain access to the asset. In some embodiments, the set of users are employees or members of an organization, such as an online service provider, a for-profit organization, or a not-for-profit organization. In some embodiments, the set of users includes users having already approved access to the asset. An evaluation can be made to determine if one or more users of the set of users should continue to have access to the asset. Such an evaluation can be made periodically through human intervention or dynamically using AI and/or ML of one or more computing devices of the system.

At block 404, first user data for a first user in the set of users is obtained. The first user data can at least specify organizational information for the first user in the set of users. In some embodiments, the organizational information pertains to personnel information of an employee. In some embodiments, the organizational information pertains to membership information of a member of an organization, such as a not-for-profit organization. In some embodiments, the organizational information can include personnel information. The personnel information can comprise title information for individual users in the set of users, first and last names of the individual users, communication information or data linked to the individual users, and so forth.

At block 406, a value usable to regulate access to the asset associated with the system is determined. The determined value can be based on a plurality of sub-values. In some embodiments, the value can be based on the organizational information for the first user. The organizational information can comprise title information for the individual users in the set of users, first and last names of the individual users, communication information or data linked to the individual users, and so forth. Furthermore, the value can be based on second user data attributed to a second user in the set of users. In some embodiments, the second user data includes organizational information for the second user in the set of users. In some embodiments, the second user data can comprise title information for the individual users, first and last names of the individual users, communication information or data linked to the individual users, and so forth. In some embodiments, the second user is associated with a group that the first user is to join. In some embodiments, the value for the first user is determined based on a calculation that involves numerical representations of the organizational information for the first user and the organizational information for the second user.

In some embodiments, the value can be determined using an equation that accepts one or more numerical values determined from asset management data related to an first user to be assigned the value and further based on asset management data related to at least one additional user that possesses access to an asset that the first user to be assigned the value is to access. In some embodiments, the equation accepts numerical values derived from organizational information, such as title, level or rank in an organization, tenure, status or type (e.g., full-time, part-time) in the organization, location, and/or organization structure (e.g., organization chart data). A value calculated by the equation can be refined using additional data from the asset management data. The additional data can include group membership data, communication data, alias data, and/or name data. The additional data can pertain to the first user to be assigned the anomaly value 102 and the at least one additional user that possesses access to the asset that the first user to be assigned the value is to access.

At block 408, based on the determined value for the first user, access to the asset is regulated. In some embodiments, regulating access to the asset comprises regulating the first user's access to the asset. In some embodiments, the value for the first user is automatically or manually analyzed to determine the regulated access to the asset. For example, when the value is below an anomaly value threshold, the first user can be granted access to the asset. However, in another example, when the value falls within a value range, access to the asset can be delayed pending further review, where such review may be automated AI or ML analysis or accomplished by way of human analysis. In some embodiments, when the value exceeds a value threshold, access to the asset can be suspended, revoked, disallowed, and so forth, pending results from machine or human analysis.

Figure 5:
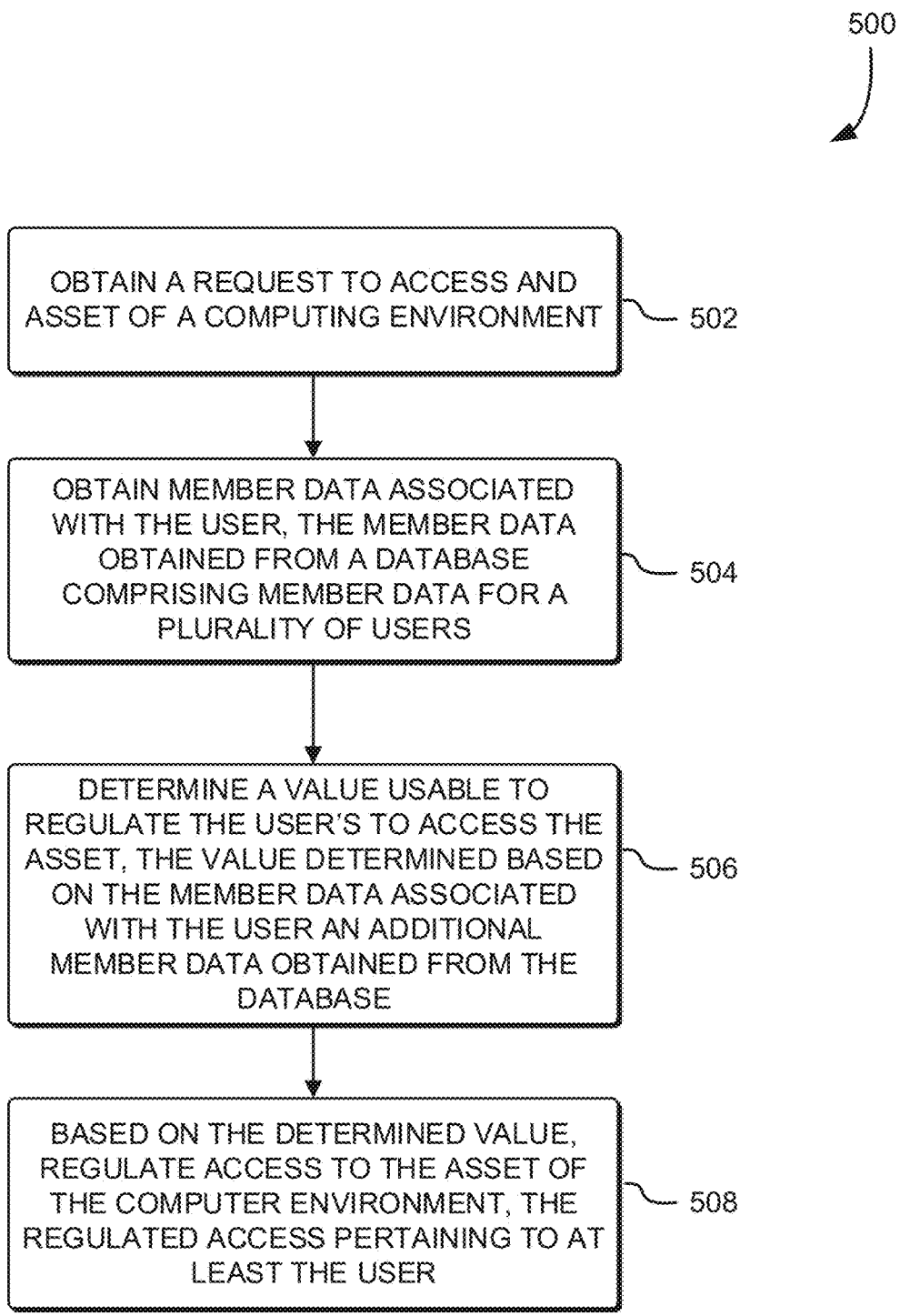
FIG. 5 illustrates yet another flow diagram including various processing acts, implemented by a system environment with one or more computing devices, which provide anomaly value determination or calculation for individuals of an organization.

FIG. 5 illustrates a flow diagram 500 including various processing acts, implemented by a system environment with one or more computing devices, which provide anomaly value determination or calculation for individuals of an organization. In some implementations, the acts of the flow diagram 500 can be executed by one or more computing devices of the example system environments 100 and 200 illustrated in FIGS. 1 and 2, respectively. The example system environments 100 and/or 200 can execute computer executable instructions incorporating at least some of the processing acts of the flow diagram 500 to provide generation, determination, or calculation of anomaly values for individuals of an organization.

At block 502, a request to access an asset of a computing environment is obtained. In some embodiments, the request to access the asset can be obtained through a user interface. In some embodiments, the request to access the asset is obtained when the user attempts to access a critical asset that comprises limited access rights to only those users that have approved access to the asset. In some examples, the request to access the asset is obtained when the user is associated with or to be associated with a group of users that have access to the asset. In some embodiments, access to the asset can be granted when a user is granted membership to the group of users that have access the asset.

At block 504, in response to the request, member data associated with the user is obtained. In some embodiments, the member data can be obtained from a database that comprises member data for a plurality of users. In some embodiments, the member data can be included in a compilation of data pertaining to members or employees of an organization. For example, the compilation of data pertaining to members or employees of the organization can be leveraged from various data sources of the organization. In some embodiments, a primary purpose of the compilation of data can be for the determination or calculation of anomaly values linked to members or employees of the organization. In some embodiments, the member data pertains to member information of a member or employee of an organization. In some embodiments, the member data pertains to membership information of a member of an organization, such as a not-for-profit organization. In some embodiments, the member data can include personnel information. The personnel information can comprise title information for individual users in the set of users, first and last names of the individual users, communication information or data linked to the individual users, and so forth.

At block 506, a value usable to regulate the user to access the asset of the computing environment is determined. The determined value can be based on a plurality of sub-values. In some embodiments, the value can be based on the member data associated with the user and additional member data obtained from the database. The additional member data can be determined at least based on one or more users of the plurality of users having access to the asset. The member data can comprise title information for the plurality of users, first and last names of the plurality of users, communication information or data linked to the plurality of users, and so forth. In some embodiments, some of the member data is associated with a group that the user is to join. In some embodiments, the value for the user is determined based on a calculation that involves numerical representations of the member data for the user and the member data for at least one additional user of the plurality of users.

At block 508, based on the determined value, access to the asset of the computer environment is regulated. In some embodiments, regulating access to the asset comprises regulating the first user's access to the asset. In some embodiments, the value for the first user is automatically or manually analyzed to determine the regulated access to the asset. For example, when the value is below a value threshold, the first user can be granted access to the asset. However, in another example, when the value falls within a value range, access to the asset can be delayed pending further review, where such review may be automated AI or ML analysis or accomplished by way of human analysis. In some embodiments, when the value exceeds a value threshold, access to the asset can be suspended, revoked, disallowed, and so forth, pending results from machine or human analysis.

FIG. 6 illustrates aspects of an example system 600 for implementing aspects in accordance with an embodiment. In some embodiments, the system environment 100 and/or the system environment 200 can incorporate some or all of the elements of the example system 600.

As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining asset management data from a computing system of an online service provider, the asset management data comprising user metadata for a plurality of users to access a resource of the online service provider, the user metadata of the asset management data comprising at least personnel information for individual users of the plurality of users;
    identifying the personnel information for a first user of the plurality of users to access the resource of the online service provider;
    determining an anomaly value for the first user, the anomaly value based on the personnel information for the first user, the anomaly value further based on the personnel information for a second user of the plurality of users to access the resource of the online service provider; and
    based on the anomaly value for the first user, determining the first user's right to access the resource.

2. The computer-implemented method of claim 1, wherein the personnel information for the first user comprises at least a business title of the first user and the personnel information for the second user of the plurality of users comprises at least a business title of the second user, and wherein determining the anomaly value for the first user comprises calculating the anomaly value using an equation that accepts a first numerical value based on the business title of the first user and a second numerical value based on the business title of the first user and the business title of the second user.

3. The computer-implemented method of claim 1, wherein the user metadata for the plurality of users to access the resource of the online service provider further comprises a first name and a last name of the individual users of the plurality of users, the method further comprising:
    identifying the first name or the last name of the first user is at least similar to the first name or the last name of at least one other user of the plurality of the users;

adjusting the anomaly value to determine an adjusted anomaly value for the first user based on identifying the first name or the last name of the first user is at least similar to the first name or the last name of the at least one other user of the plurality of users; and based on the adjusted anomaly value, determining the first user's right to access the resource.

4. The computer-implemented method of claim 1, wherein the asset management data comprises group membership data for the individual users of the plurality of users and communication data for the individual users of the plurality of users, the method further comprising:

adjusting the anomaly value to determine an adjusted anomaly value for the first user based on the asset management data comprising the group membership data and the communication data; and based on the adjusted anomaly value, determining the first user's right to access the resource.

5. A system, comprising:

at least one computing device configured to implement one or more services, wherein the one or more services:

determine a set of users to access an asset associated with a system comprising one or more computing devices;

obtain first user data for a first user in the set of users, the first user data at least specifying organizational information for the first user in the set of users;

determine a value usable to regulate access to the asset associated with the system, the value based on the organizational information for the first user and the value further based on second user data attributed to a second user in the set of users; and based on the determined value, regulate access to the asset associated with the system.

6. The system of claim 5, wherein the organizational information is first organizational information and the second user data attributed to the second user is second organizational information, the first organizational information specifying a business title of the first user and the second organizational information specifying a business title of the second user.

7. The system of claim 5, wherein determining the value comprises calculating the value based on a first value derived from the organizational information for the first user and a second value derived from individual organizational information linked to users in the set of users.

8. The system of claim 5, wherein regulating access to the asset associated with the system comprises allowing the first user to access the asset, revoking the first user's access to the asset, suspending the first user's access to the asset, or flagging the first user's access to the asset, the flagging to trigger additional review of the first user's access to the asset.

9. The system of claim 5, wherein the asset associated with the system comprises data, access to the data to be controlled based on a minimum access level assigned to the data or computer storage hosting the data.

10. The system of claim 5, wherein the one or more services further are to: compare the value to at least one value range to determine the value falls within the at least one value range, and wherein regulating the access to the asset is based on at least determining the value falls within the at least one value range.

11. The system of claim 10, wherein the at least one value range is based on a set of additional values usable to regulate access to the asset associated with the system, the set of additional values comprising values calculated for individual users in the set of users.

12. The system of claim 5, wherein regulating the access to the asset associated with the system based on the determined value comprises:

determining the value exceeds a threshold value, and regulating access to the asset associated with the system based on determining the value exceeds the threshold value.

13. A non-transitory computer-readable storage medium storing thereon executable instructions that, as a result of being executed by one or more processors of a computer system, cause the computer system to at least:

obtain a request to access an asset of a computing environment;

in response to the request, determine member data associated with a user, the member data obtained from a database comprising member data for a plurality of users;

determine a value usable to regulate the user's access to the asset of the computing environment, the value determined based on the member data associated with the user and additional member data obtained from the database, the additional member data determined at least based on one or more users of the plurality of users having access to the asset; and based on the value, regulate access to the asset of the computer environment, the regulated access pertaining to at least the user.

14. The non-transitory computer-readable storage medium of claim 13, wherein the member data associated with the user comprises a title assigned to the user from a plurality of titles assignable to members of an organization, and wherein the additional member data obtained from the database comprises at least one additional title assigned to at least one or more users of the plurality of users having access to the asset.

15. The non-transitory computer-readable storage medium of claim 14, wherein the user is a human user or the user is a computerized user implemented by executable instructions, that when executed by one or more processors, cause the computerized user to executed one or more tasks associated with the asset of the computer environment.

16. The non-transitory computer-readable storage medium of claim 13, wherein the member data associated with the user comprises at least a title of the user and the additional member data comprises at least a title of an additional user associated with the one or more users of the plurality of users, and wherein determining the value for the user comprises calculating the value using an equation that accepts a first numerical value based on the title of the user and a second numerical value based on the title of the user and the title of the additional user.

17. The non-transitory computer-readable storage medium of claim 13, wherein the member data associated with the user comprises at least a first name and a last name of the user and the additional member data obtained from the database comprises a first name and a last name of the one or more users of the plurality of users having access to the asset, wherein the executable instructions that, as a result of being executed by the one or more processors of a computer system, further cause the computer system to at least:

determine the first name or the last name of the user is at least similar to the first name or the last name of the one or more users of the plurality of users having access to the asset;

adjust the value to determine an adjusted value for the user based on determining the first name or the last name of the user is at least similar to the first name or the last name of the one or more users of the plurality of users having access to the asset; and based on the adjusted value, regulate access to the asset of the computer environment, the regulated access pertaining to at least the user.

18. The non-transitory computer-readable storage medium of claim 13, wherein the member data associated with the user comprises an alias of the user and the additional member data obtained from the database comprises an alias of the one or more users of the plurality of users having access to the asset, wherein the executable instructions that, as a result of being executed by the one or more processors of a computer system, further cause the computer system to at least:

determine the alias of the user is at least similar to the alias of the one or more users of the plurality of users having access to the asset;

adjust the value to determine an adjusted value for the user based on determining the alias of the user is at least similar to the alias of the one or more users of the plurality of users having access to the asset; and based on the adjusted value, regulate access to the asset of the computer environment, the regulated access pertaining to at least the user.

19. The non-transitory computer-readable storage medium of claim 13, wherein regulating the access to the asset of the computer environment comprises:

determining the value exceeds a threshold value; and regulating access to the asset of the computer environment based on determining the value exceeds the threshold value.

20. The non-transitory computer-readable storage medium of claim 13, wherein regulating access to the asset of the computer environment comprises allowing the user to access the asset, revoking the user's access to the asset, suspending the user's access to the asset, or flagging the user's access to the asset, the flagging to trigger additional review of the user's access to the asset.

21. The non-transitory computer-readable storage medium of claim 13, wherein regulating the access to the asset of the computer environment comprises:

calculating a percentage value based on the value and historical data that includes one or more prior values usable to regulate the user's to access the asset of the computing environment;

comparing the percentage value to a predetermined percentage value; and regulating access to the asset of the computer environment based on the comparison of the percentage value to the predetermined percentage value.

* * * * *